(12) United States Patent
Itou et al.

(10) Patent No.: US 7,562,825 B2
(45) Date of Patent: Jul. 21, 2009

(54) METHOD AND APPARATUS FOR OPTICALLY READING INFORMATION ATTACHED TO A TARGET

(75) Inventors: Kunihiko Itou, Chiryu (JP); Kenichi Yoshida, Nagoya (JP)

(73) Assignee: Denso Wave Incorporated, Tokyo (JP)

( * ) Notice: Subject to any disclaimer, the term of this patent is extended or adjusted under 35 U.S.C. 154(b) by 271 days.

(21) Appl. No.: 11/342,806

(22) Filed: Jan. 31, 2006

(65) Prior Publication Data
US 2006/0196942 A1 Sep. 7, 2006

(30) Foreign Application Priority Data
Mar. 3, 2005 (JP) ............................. 2005-058963

(51) Int. Cl.
*G06K 7/10* (2006.01)
*G06K 9/24* (2006.01)
(52) U.S. Cl. .............................. 235/462.21; 235/462.1; 235/462.2; 235/462.22; 235/454; 382/322
(58) Field of Classification Search ......... 235/435–487; 714/746–797; 382/322
See application file for complete search history.

(56) References Cited

U.S. PATENT DOCUMENTS

| | | | |
|---|---|---|---|
| 5,187,600 A * | 2/1993 | Sato | ........................... 235/454 |
| 5,426,288 A | 6/1995 | Obata et al. | |
| 6,394,349 B1 * | 5/2002 | Shigekusa et al. | ........... 235/454 |
| 6,454,167 B1 * | 9/2002 | Barkan et al. | .......... 235/462.01 |
| 6,685,095 B2 * | 2/2004 | Roustaei et al. | ........ 235/472.01 |
| 6,722,565 B2 * | 4/2004 | Takeuchi et al. | ............ 235/454 |
| 2001/0038037 A1 * | 11/2001 | Bridgelall et al. | ...... 235/462.14 |
| 2005/0151053 A1 * | 7/2005 | Griffin et al. | ................ 250/206 |
| 2006/0043187 A1 * | 3/2006 | He et al. | .................. 235/462.2 |
| 2006/0186205 A1 * | 8/2006 | Page | ..................... 235/462.22 |

FOREIGN PATENT DOCUMENTS

| | | |
|---|---|---|
| JP | H05-181995 | 7/1993 |
| JP | H06-162249 | 6/1994 |

\* cited by examiner

*Primary Examiner*—Seung H Lee
*Assistant Examiner*—Christle I Marshall
(74) *Attorney, Agent, or Firm*—Posz Law Group, PLC

(57) ABSTRACT

In an apparatus, a collimated-beam irradiating unit irradiates on the target a substantially collimated beam with a size thereon. A first pickup unit causes the photodetector to pick up through the imaging optics a first image of the target while the substantially collimated beam is being irradiated on the target by the collimated-beam irradiating unit. A measuring unit measures size information indicative of the size of the collimated beam being irradiated on the target based on the picked-up second image. A distance determining unit determines a distance between the apparatus and the target based on the measured size information of the collimated beam.

19 Claims, 9 Drawing Sheets

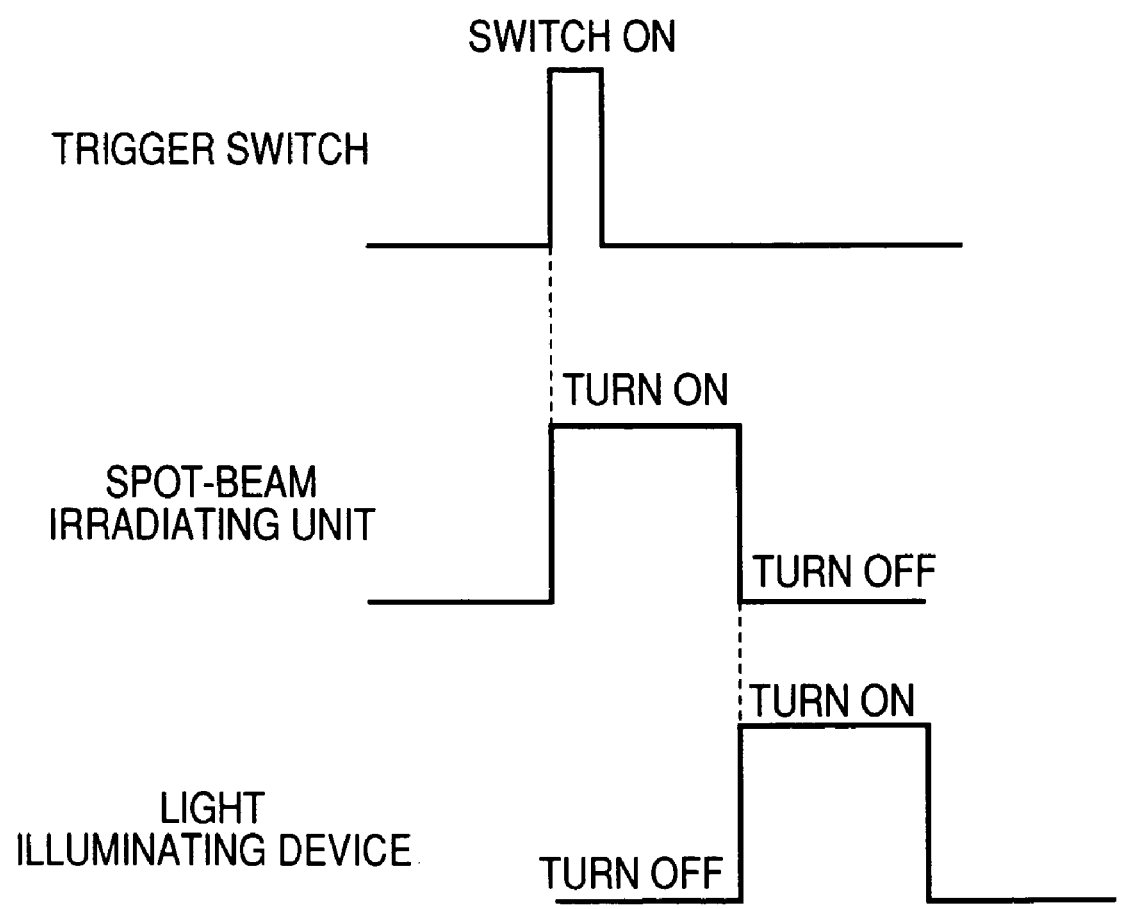

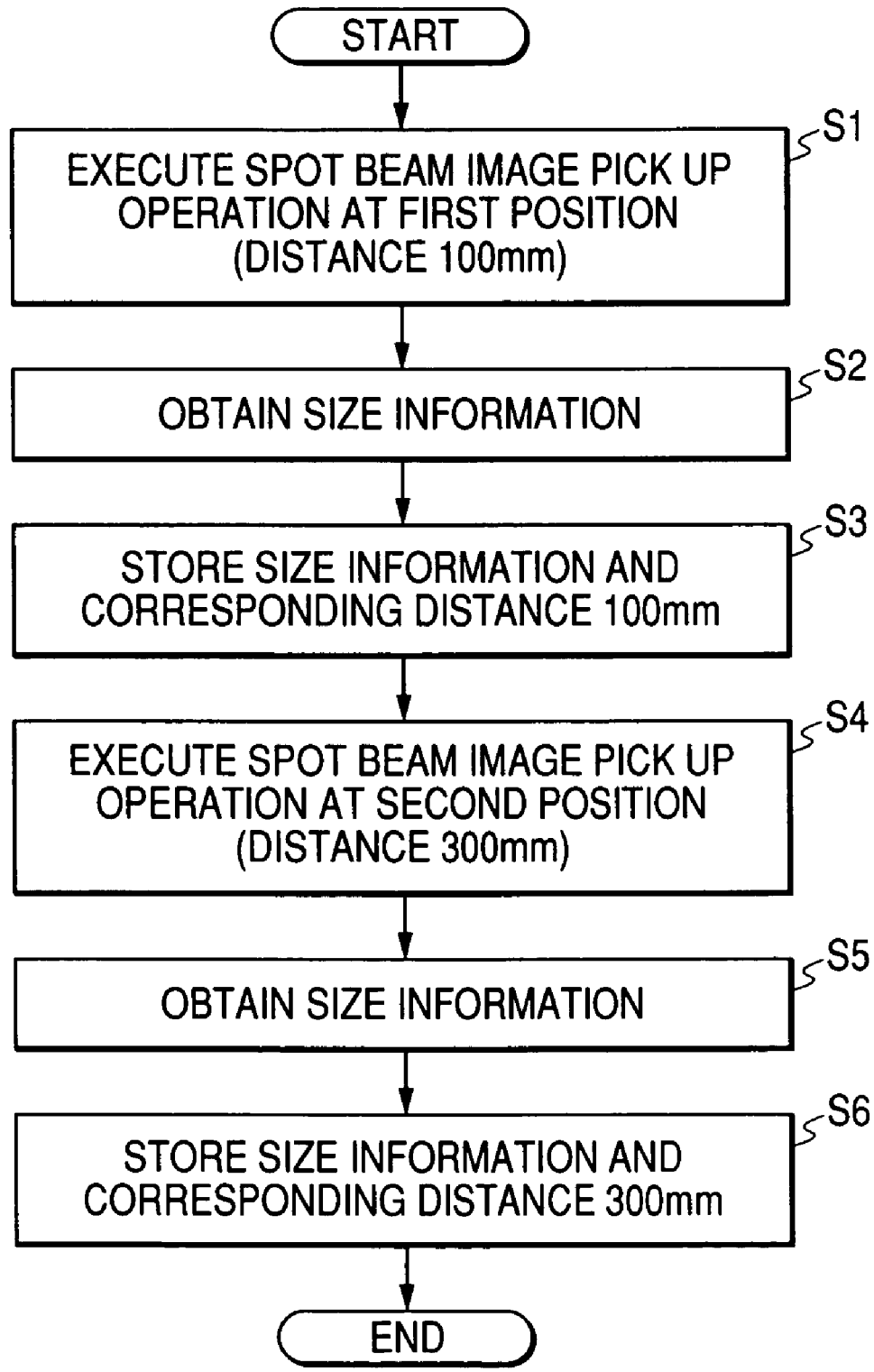

METHOD AND APPARATUS FOR OPTICALLY READING INFORMATION ATTACHED TO A TARGET

CROSS REFERENCE TO RELATED APPLICATION

This application is based on Japanese Patent Application 2005-058963 filed on Mar. 3, 2005. This application claims the benefit of priority from each of the Japanese Patent Applications, so that the descriptions of which are all incorporated herein by reference.

BACKGROUND OF THE INVENTION

1. Field of the Invention

The present invention relates to a method and apparatus for optically reading a target on which optically readable information, such as an information code is written.

2. Description of the Related Art

Handheld optical information readers aim at reading an optically readable information code, such as a barcode, a two-dimensional code, or other similar codes. In this specification, a target itself or a target to which optically readable information is attached is collectively referred to as "target".

For improving reading performance of handheld optical information readers, a type of handheld optical information readers that can read an information code positioned at a distance therefrom has been provided.

Such type of handheld optical information readers has a handheld body case provided at its one end portion with a reading window, a photodetector, such as a CCD (Charge-Coupled Device) area sensor, an imaging unit with an imaging lens, and a reading unit composed of a light illuminating device. The photodetector, the imaging unit, and the reading unit are installed in the body case, respectively.

In this type of handheld optical information reader, a user pushes a trigger switch attached to the handheld body case with the reading window directed to a target, such as a barcode. The push of the trigger switch causes the light illuminating device to supply light through the reading window toward the target. The light supplied from the light illuminating device is irradiated to the target (barcode) so that light reflected from the target based on the irradiated light enters through the reading window into the imaging unit. The light entered into the imaging unit is focused on the photodetector by the imaging lens to be imaged thereon, so that an image corresponding to the target is picked up by the photodetector.

In this type of handheld optical information reader, a certain range of a reading distance defined as a distance between the reading window and the target has been previously determined depending on the relationship between an intensity of the irradiated light on the target and an exposure time of the photodetector. The determined range of the reading distance allows the reading apparatus to precisely read the target therewithin.

If the reading distance between the reading window and the target exceeds the determined range, the intensity of the irradiated light on the target would be insufficient, causing the need for repeat reading operations to arise.

For avoiding such repeat reading operations, conventional optical information readers with means for measuring a reading distance between the reading window and a target in a noncontact manner have been well known.

First and second examples of the conventional optical information readers are disclosed in Japanese Unexamined Patent Publication No. H5-181995, and U.S. Pat. No. 5,426, 288 corresponding to Japanese Unexamined Patent Publication No. H6-162249, respectively.

The former Japanese Patent Publication, as the first example, shows a barcode reader with a range sensor for measuring a distance between the reader and a target based on triangulation techniques. The barcode reader controls the diameter of a laser beam as an irradiated light on the target so that the laser beam diameter is appropriately set.

The later U.S. Patent Publication, as the second example, shows an optical information reader with means for measuring a period between irradiation of a laser beam irradiation from the optical information reader toward a target and return of a laser beam reflected from the target based on the irradiated laser beam to the optical information reader. The optical information reader determines whether a reading distance between the reader and the target is within a predetermined range based on the measured period, allowing the optical information reader to precisely read the target based on the determined result.

In the first example of the conventional optical information readers, the range sensor may be comparatively costly, and may have a comparatively large size to require an appreciable space for installing the range sensor. This may upsize the conventional optical information.

In the second example of the conventional optical information readers, because the velocity of the laser beam may be very fast, it may be difficult to precisely measure the period between irradiation of the laser beam and reception of the reflected laser beam.

SUMMARY OF THE INVENTION

The present invention has been made on the background so that optical reading apparatuses according to preferable embodiments of the present invention are capable of making simple and inexpensive a structure to determine a distance between each optical reading apparatus and a target.

According to one aspect of the present invention, there is provided an apparatus for optically reading out, through an imaging optics, information by a photodetector. The information is attached to a target. The apparatus includes a collimated-beam irradiating unit designed to irradiate on the target a substantially collimated beam with a size thereon. The apparatus includes a first pickup unit operative to cause the photodetector to pick up through the imaging optics a first image of the target while the substantially collimated beam is being irradiated on the target by the collimated-beam irradiating unit. The apparatus includes a measuring unit operative to measure size information indicative of the size of the collimated beam being irradiated on the target based on the picked-up second image. The apparatus includes a distance determining unit operative to determine a distance between the apparatus and the target based on the measured size information of the collimated beam.

According to another aspect of the present invention, there is provided a method of optically reading out, through an imaging optics installed in an apparatus, information by a photodetector installed therein. The information is attached to a target. The method includes irradiating on the target a substantially collimated beam with a size thereon. The method includes causing the photodetector to pick up through the imaging optics a first image of the target while the substantially collimated beam is being irradiated on the target by the collimated-beam irradiating unit. The method includes measuring size information indicative of the size of the collimated beam being irradiated on the target based on the picked-up second image. The method includes determining a distance between the apparatus and the target based on the measured size information of the collimated beam.

In the one and another aspects of the present invention, the substantially collimated beam irradiated on the target and the imaging optics create a relationship in which size information indicative of the size of the collimated beam irradiated on the target in the first image picked up by the photodetector varies with change in the distance between the apparatus and the target.

The relationship therefore allows the distance between the apparatus and the target to be determined based on the measured size information.

BRIEF DESCRIPTION OF THE DRAWINGS

Other objects and aspects of the invention will become apparent from the following description of embodiments with reference to the accompanying drawings in which:

FIG. 6 is a timing chart schematically illustrating turn-on timings of a trigger switch, a spot-beam irradiating unit, and a light illuminating device illustrated in FIG. 3;

FIG. 7 is a flowchart schematically illustrating operations executed by a control circuit shown in FIG. 3 when measuring a relationship between a reading distance and size information of the spot beam according to the first embodiment;

DETAILED DESCRIPTION OF EMBODIMENTS OF THE INVENTION

Figure 1:
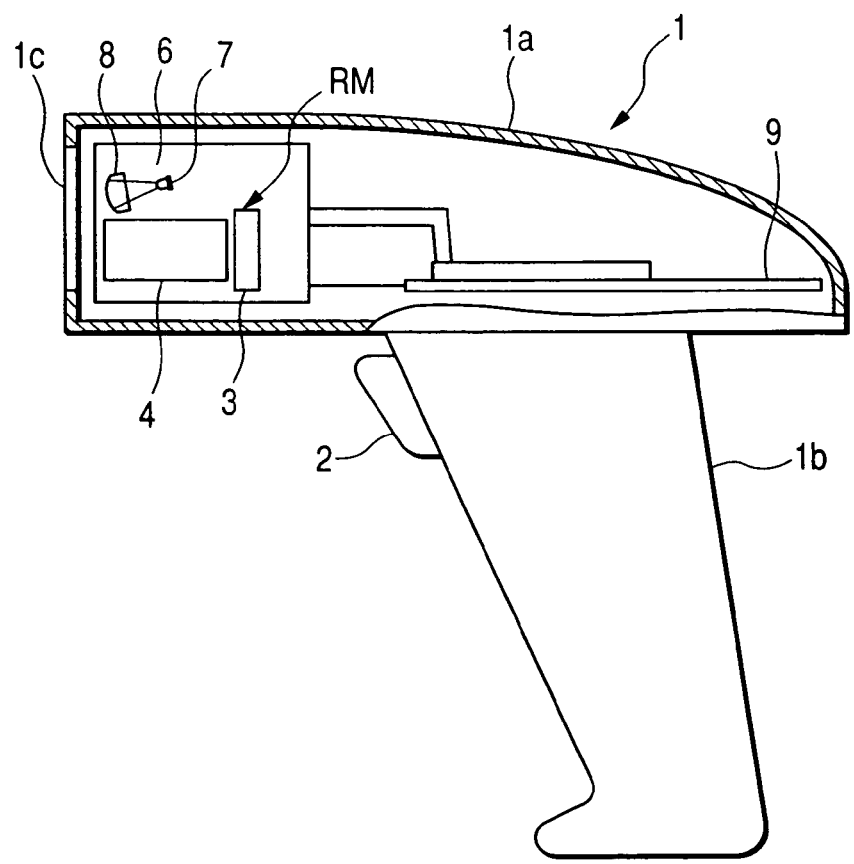
FIG. 1 is a partially cross sectional side view schematically illustrating a structure of a two-dimensional code reader according to a first embodiment of the present invention.

Embodiments of the present invention will be described hereinafter with reference to the accompanying drawings. In the embodiments, the invention is applied to a gun-shaped two-dimensional code reader.

First Embodiments

Referring to FIGS. 1 to 6, a two-dimensional code reader CR as an apparatus for optically reading a target according to a first embodiment of the present invention is provided with a gun-shaped case (housing) 1. The gun-shaped case 1 has, for example, a thin rectangular parallelepiped main body 1a. One lateral end portion of the main body 1a is rounded.

The gun-shaped case 1 is provided at one side (specifically, bottom side in FIG. 1) of the one lateral end portion side of the main body 1a with a grip portion 1b. The grip portion 1b is integrally formed to the main body 1a. The grip portion 1b allows a user to easily grip the two-dimensional code reader CR in one hand and handle it.

The other lateral end portion of the main body 1a includes a lateral sidewall in which a reading window 1c is formed. The reading window 1c has, for example, a rectangular plate like shape and translucency. The two-dimensional code reader CR is also provided with a trigger switch 2. The trigger switch 2 is disposed to one side surface of the grip portion 1b and directed to the reading window 1c. The trigger switch 2 permits a user to instruct a reading operation to the two-dimensional code reader CR.

The two-dimensional code reader CR is provided with a reading mechanism (optical reading mechanism) RM disposed in the other lateral end portion of the housing 1. In the first embodiment, the other lateral end portion of the housing 1 is referred to as "head portion".

The reading mechanism RM is operative to read a two-dimensional code Q, such as a QR (Quick Response) code, written on a target R (see FIGS. 3 and 4) by printing or other similar methods. The target R includes a label that is a piece of paper or another media. The target R can be attached on goods, which is the same as general barcodes. The two-dimensional code Q includes information, such as, a manufactures serial number, a name, a unique identification number and a date of manufacture of the goods.

In recent years, the target R includes the screen of a display, such as a liquid crystal display (LCD) in a computer terminal, such as a cellular phone or a PDA (Personal Digital Assistant); a two-dimensional code is displayed on the screen of the display.

For example, the two-dimensional code Q consists of different color cells, such as black and white cells arranged in a matrix to form specific patterns therein, thereby indicating data. One of the black and white colors corresponds to one of bit values "0" and "1", and the other of the black and white colors to the other of bit values "0" and "1". After reading the cells, it is possible to digitize easily the read color data to decode it.

Figure 2:
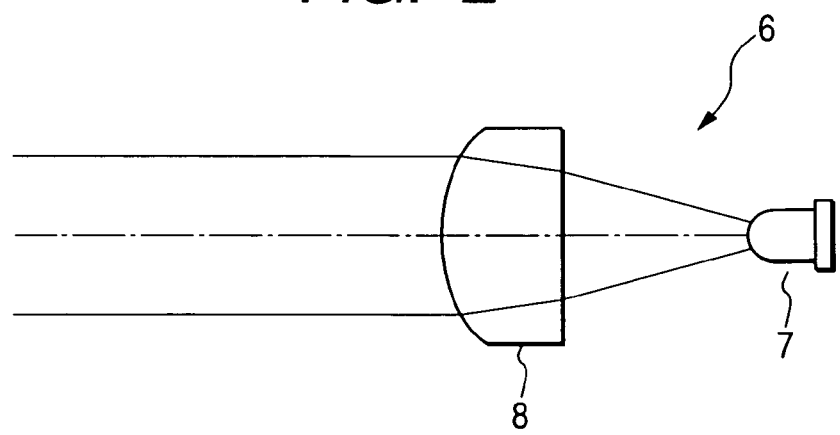
FIG. 2 is an enlarged view schematically illustrating the structure of a spot-beam irradiating unit shown in FIG. 1.
Figure 3:
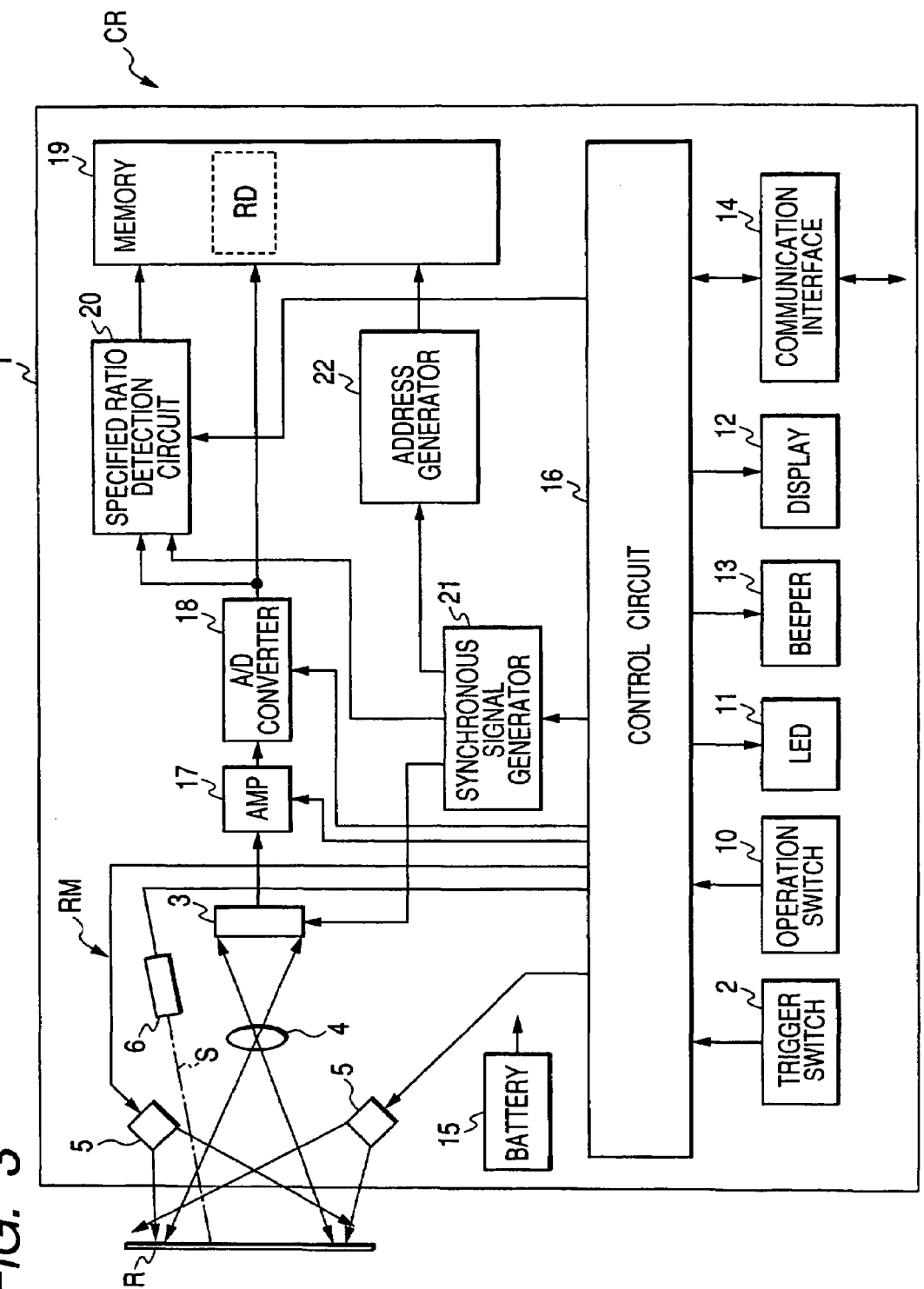
FIG. 3 is a block diagram schematically illustrating an electrical structure of the two-dimensional code reader according to the first embodiment.

As schematically illustrated in FIGS. 1 to 3, the reading mechanism RM includes a photodetector 3 with a predetermined field of view (FOV) F, an imaging lens 4, and a pair of light illuminating devices 5, which is not shown in FIG. 3. The photodetector 3 and the imaging lens 4 constitute an imaging optics. Note that the imaging optics can include at least one mirror as need arises.

The reading mechanism RM also includes a spot-beam irradiating unit 6 for irradiating a spot beam S to be used for detection of a reading distance between the reading window 1c and the target R.

The photodetector 3 is composed of, for example, a CCD area sensor. The photodetector 3 is located at the center of the head portion of the main body 1a. The photodetector 3 has a constant active area (light sensitive pixel area PA) composed of pixels arranged in matrix (rows and columns). The photodetector 3 also has a predetermined optical axis. The photodetector 3 is arranged so that its pixel area is parallely opposite to the reading window 1c of the main body 1a and its optical axis passes through the center of the reading window 1c. The exposure time, that is, the shutter speed of the photodetector 3, can be externally controlled.

The imaging lens 4 has a body tube and a plurality of lens elements that are disposed coaxially therein. The imaging lens 4 has a predetermined optical axis O. The imaging lens 4 is arranged so that its optical axis O (see FIG. 4) extends orthogonally with the head end wall, which is formed with the reading window 1c, of the main body 1a. That is, the reading window 1c, the photodetector 3 and the imaging lens 4 are coaxially arranged with one another in the main body 1a. The reading mechanism RM (the imaging lens 4) has a constant field angle θ (see FIG. 4).

Figure 4:
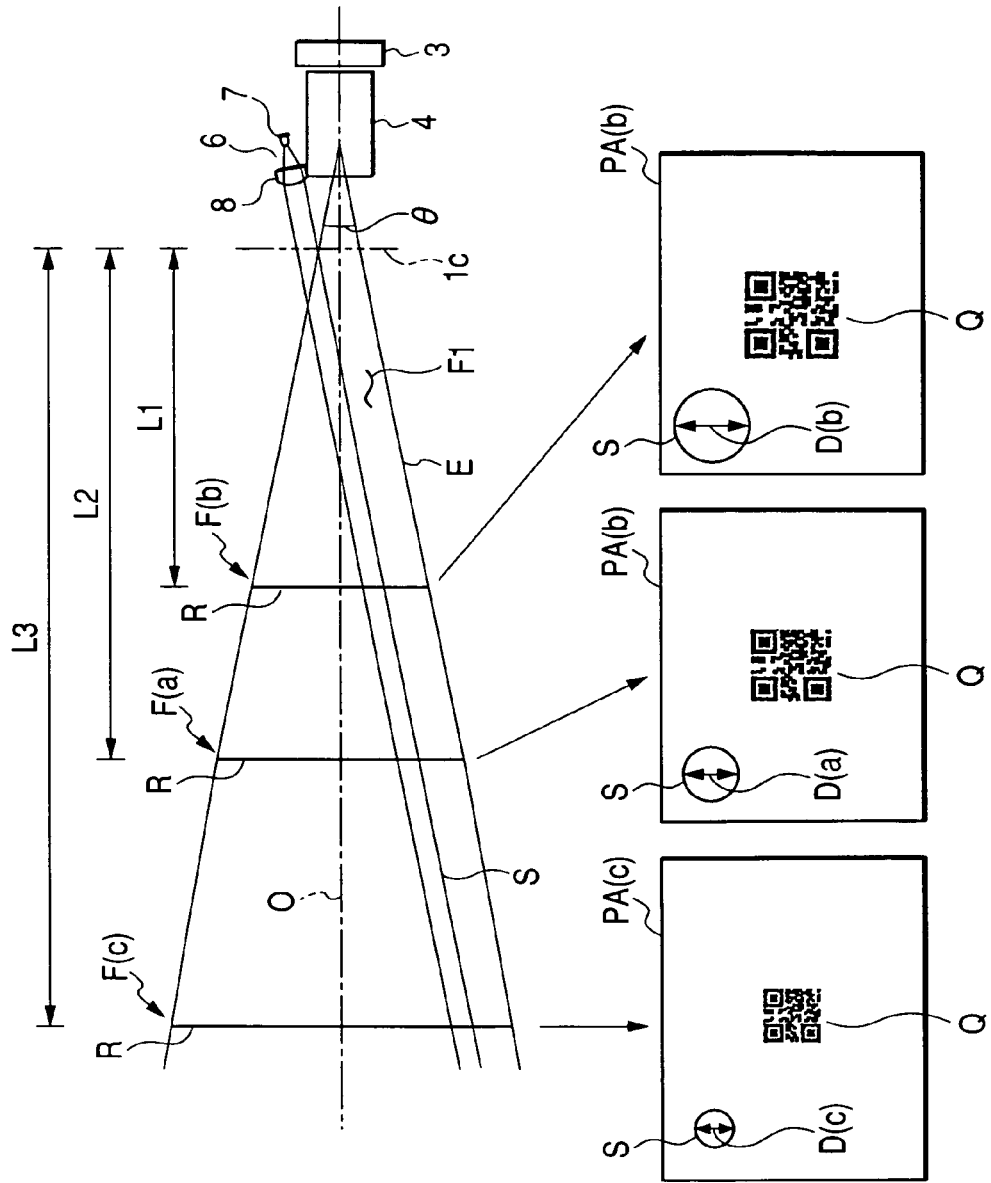
FIG. 4 is a view schematically illustrating a change of the size of a spot beam irradiated from the spot-beam irradiating unit according to the first embodiment.

Each of the light illuminating devices 5 is disposed around the imaging lens 4 except for one radial side, specifically the lower light side, thereof (see FIG. 4). Specifically, each of the light illuminating devices 5 is provided with a light emitting device (LED) serving as a light source. Each of the light illuminating devices 5 is also provided with a light lens disposed between each light emitting device and the reading window 1c. An optical axis of each light lens is directed to the reading window 1c so that each light lens is operative to collect and diffuse illuminating light, such as while light, emitted from each light emitting device through the reading window 1c.

Specifically, when the reading window 1c of the code reader CR is positioned to be opposite to the target R on which the two-dimensional code Q is written, the illuminating light emitted from each of the light illuminating devices 5 is irradiated through the reading window 1c to the two-dimensional code Q. Light reflected from the two-dimensional code Q is entered through the reading window 1c into the imaging lens 4. The reflected light entered into the imaging lens 4 is focused on the pixel area of the photodetector 3 by the imaging lens 4, so that an image corresponding to the target R is picked up by the photodetector 3.

The spot-beam irradiating unit 6, as shown in FIGS. 1 and 2, is disposed closely around the imaging lens 4 to be directed toward the reading window 1c. For example, the spot-beam irradiating unit 6 is disposed to the one radial side (lower right side) of the imaging lens 4 such that the optical axis of the spot-beam irradiating unit 6 intersects with the optical axis O of the imaging optics. This structure allows each of the light illuminating device 5 and the spot-beam irradiating unit 6 to be positionally free from each other.

The spot-beam irradiating unit 6 is provided with a light source 7 consisting of a laser diode 7. The spot-beam irradiating unit 6 is also provided with a condenser lens 8 disposed between the light source 7 and the reading window 1c to be coaxial to the light source 7. The condenser lens 8 has opposite first and second lens planes 8a and 8b. The first lens plane 8a of the condenser lens 8 is flat and opposite to the output plane of the light source 7, and the second lens plane 8b is convexly spherical and opposite to the reading window 1c. The light source 7 is disposed at the focal point of the condenser lens 8.

The light source 7 is operative to irradiate a spot beam S with a color different from the color of the illuminating light, such as a green. The condenser lens 8 is configured to substantially collimate the irradiated spot beam S.

Specifically, the light source 7 and the condenser lens 8 of the spot-beam irradiating unit 6 provide a telecentric system. The telecentric system (the spot-beam irradiating unit 6) allows the spot beam S irradiated from the light source 7 to be substantially collimated parallel to the optical axis of the condenser lens 8 and to have a circle in its lateral cross section. In other words, the telecentric system (the spot-beam irradiating unit 6) allows the field angle of the spot beam S irradiated from the condenser lens 8 to substantially become zero.

In addition, the imaging lens 4, the photodetector 3, the light source 7, and the condenser lens 8 are located at predetermined positions, respectively, such that the collimated spot beam S from the condenser lens 8 is traveled across the optical axis O and along one edge E, such as the top left edge, of the field F1 defined by the field angle θ so as to be irradiated in the field of view F on the target R at the left top side thereof (see FIG. 4).

As shown in FIG. 4, because the spot beam S irradiated from the spot-beam irradiating unit 6 is a substantially collimated beam, the absolute size, such as the spot size, of the spot beam S is substantially kept constant independently of variation in the reading distance L from the spot-beam irradiating unit 6 to the target R.

In contrast, because the imaging lens 4 has the constant field angle θ, the farer the reading distance L from the reading window 1c of the code reader CR to the target R is, the larger the size of the field of view F of the photodetector 3 on the target R is. As illustrated in FIG. 4, because the pixel area PA of the photodetector 3 is constant, the relative relationship between the reading distance L and the size of the field of view F on the target R causes the size of the spot beam S on the pixel area PA to be relatively smaller with increase in the reading distance L. In other words, the relative relationship between the reading distance L and the size of the field of view F reduces the percentage of the spot beam S in the field of view F with increase in the reading distance.

Specifically, when the code reader CR is arranged so that a value of the reading distance L between the reading window 1c and the target R is L2, for example, 200 mm (in a state (a) in FIG. 4), the field of view F on the target R has a predetermined size of F(a). In the state (a) in FIG. 4, the spot beam S irradiated on the top left of the pixel area PA has a predetermined beam diameter of D(a) (see reference character PA(a) in FIG. 4).

If the code reader CR is arranged such that a value of the reading distance L is L1 shorter than the distance L2, for example, 100 mm (in another state (b) in FIG. 4), the field of view F on the target R has a predetermined size of F(b) smaller than that of F(a). This results in that the spot beam S irradiated on the top left of the pixel area PA has a predetermined beam diameter of D(b) larger than that of D(a) (see reference character PA(b) in FIG. 4).

If the code reader CR is arranged so that a value of the reading distance L is L3 longer than the distance L2, for example, 300 mm (in a further state (c) in FIG. 4), the field of view F on the target R has a predetermined size of F(c) larger than that of F(a). This results in that the spot beam S irradiated on the top left of the pixel area PA has a predetermined beam diameter of D(c) smaller than that of D(a) (see reference character PA(c) in FIG. 4).

Note that, in FIG. 4, three different images on the pixel area PA corresponding to the three different reading distances L2, L1, and L3 are illustrated by the reference characters PA(a), PA(b), and PA(c). For convenience of explanation, in each of the three images on the pixel area PA, the optical image corresponding to the two dimensional code Q is located at the center of the pixel area PA.

The spot-beam irradiating unit 6 is configured to turn on (irradiate) the spot beam S whenever the trigger switch 2 is pushed to the on position by a user and to turn off it when the target R (two-dimensional code Q) is picked up by the photodetector 3 subsequent to the switch-on of the trigger switch 2.

The spot-beam irradiating unit 6 can be configured to continuously or periodically irradiate the spot beam S except when the target R (two-dimensional code Q) is picked up by the photodetector 3.

Referring to FIG. 1, the two-dimensional code reader CR is provided with a circuit board 9 disposed in the main body 1a at its one end side, specifically backside opposite to the head side. In the circuit board 9, electrical components of the code reader CR are installed (see FIG. 3). As illustrated in only FIG. 3, the code reader CR is provided with an operation switch 10, an LED (light emitting device) 11, a liquid crystal display 12, a beeper 13, and a communication interface 14. The elements 10 to 14 are disposed to the other side (specifically, top side in FIG. 1) of the one lateral end portion of the main body 1a, respectively. The operation switch 10 allows a user to input various instructions to the code reader CR. The LED 11 is operative to visually indicate information to send notice to a user. The beeper 13 is operative to emit a series of beeps to send notice to a user. The communication interface 14 allows the code reader CR to communicate with external devices.

On the other hand, the two-dimensional code reader CR is provided with a battery 15 as a power supply for activating the above optical devices 3, 5, 6, the electrical components installed in the circuit board 9, and the above I/O devices 2, 10-14, respectively.

As shown in FIG. 3, in the circuit board 9, a control circuit 16 composed of at least one microcomputer is provided. The microcomputer is composed of, for example, a CPU (Central Processing Unit), an internal memory unit including a ROM (Read Only Memory), a RAM (Random Access Memory) and the like, and peripherals.

The control circuit 16 operates based on power supplied from the battery 15. The control circuit 16 operates in accordance with a program stored in, for example, the ROM to control the whole of the code reader CR and to perform decoding processes and other processes. The program can be loaded from a signal bearing media to the memory unit. Examples of suitable signal bearing media include recordable type media such as floppy disks and CD (Compact Disk)-ROM, and transmission type media such as digital and analog communications links.

The control circuit 16 is communicably coupled to the trigger switch 2 and the operation switch 10 so that the commands sent from the switches 2 and 10 are input to the control circuit 16. The control circuit 16 is communicably coupled to the photodetector 3, the light illuminating devices 5, and the spot-beam irradiating unit 6, respectively. Specifically, the control circuit 16 works to control the photodetector 3, the light illuminating devices 5, and the spot-beam irradiating unit 6 to execute reading processes of the two-dimensional code Q written on the target R. The control circuit 16 is also communicably coupled to the LED 11, the beeper 13, and the liquid crystal display 12 to control them. Moreover, the control circuit 16 is communicably coupled to the communication interface 14 to communicate with external devices including a management computer, through the communication interface 14.

In addition, the control circuit 16 is operative to control the exposure time (the shutter speed) of the photodetector 3.

Furthermore, in the circuit board 9, an amplifier (AMP) 17, an analog to digital (A/D) converter 18, a memory 19, a specified-ratio detection circuit 20, a synchronous signal generator 21, and an address generator 22 are installed so that they are communicably coupled to the control circuit 16, respectively.

The amplifier 17 is electrically connected to the photodetector 3 and operative to amplify an image signal outputted from the photodetector 3 at a gain based on a gain control signal sent from the control circuit 16. The A/D converter 18 is electrically connected to the amplifier 17 and operative to convert the amplified image signal into digital image data; this digital image data is light intensity data (pixel data) of each pixel of the pixel area PA of the photodetector 3.

The synchronous signal generator 21, for example, periodically generates a synchronous signal to periodically output it to the photodetector 3, the specified ratio detection circuit 20, and the address generator 22 under control of the control circuit 16.

The address generator 22 periodically counts a number of the transmitted synchronous signals to generate address signals in response to the count result, thereby outputting the address signals to the memory 19.

Specifically, the image data sequentially sent from the A/D converter 18 is stored in the memory 19 so as to correspond to the outputted address signals. The specified-ratio detection circuit 20 is operative to detect the specified patterns (bit patterns) in the image data in response to the synchronous signals based on control of the control circuit 16. The control circuit 16 and the specified-ratio detection circuit 20 identify the type of the information code corresponding to the image data, thereby decoding the image data based on the identified result by the specified-ratio detection circuit 20.

Specifically, the specified patterns in the image data allow the control circuit 16 and the specified-ration detection circuit 20 to identify the type of the image data (information code Q).

In the first embodiment, the control circuit 16 operates, in accordance with the program, to cause the spot-beam irradiating unit 6, the photodetector 3, and the like to pick up an image (spot beam image) of the target R on which the spot beam S is being irradiated. In addition, the control circuit 16 operates, in accordance with the program, to measure size information indicative of the relative size of the spot beam S on the pixel area PA from the picked-up image, thereby determining the reading distance L between the target R and the reading window 1c based on the measured information.

For example, the control circuit 16 can measure, as the size information indicative of the relative size of the spot beam S, the number of pixels in a circular region on which the spot beam S is irradiated in the pixel area PA based on the picked-up image. In addition, the control circuit 16 can measure, as the size information indicative of the relative size of the spot beam S, the number of pixels of the spot-beam irradiated circular region along one diameter thereof in the pixel area PA based on the picked-up image; this one diameter is parallel to any one of the row direction and the column direction of the pixel area PA.

Moreover, the control circuit 16 can measure, as the size information indicative of the relative size of the spot beam S, the diametrical length or the area of the spot-beam irradiated circular region in the pixel area PA based on the picked-up image.

Figure 5A:
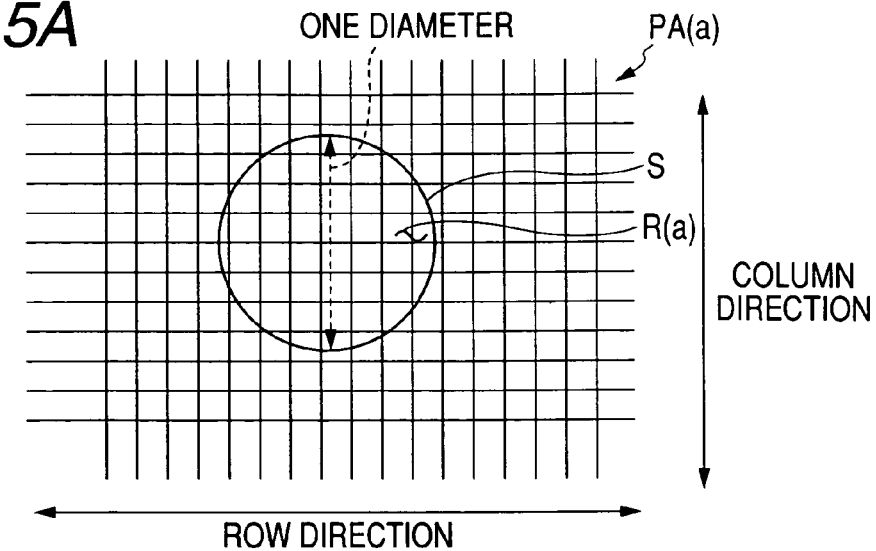
FIG. 5A is a view schematically illustrating the spot beam irradiated on a pixel area of a photodetector shown in FIG. 1, which corresponds to the state (a) in FIG. 4.
Figure 5B:
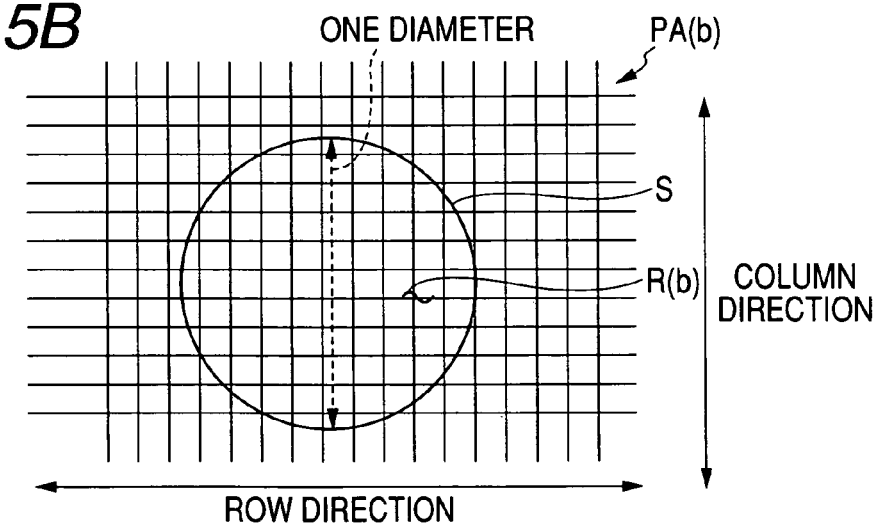
FIG. 5B is a view schematically illustrating the spot beam irradiated on the pixel area of the photodetector, which corresponds to the state (b) in FIG. 4.

FIG. 5A illustrates the spot beam S irradiated on the pixel area PA, which corresponds to the state (a) in FIG. 4, and FIG. 5B illustrates the spot beam S irradiated on the pixel area PA, which corresponds to the state (b) in FIG. 4. In addition, FIG. 5C illustrates the spot beam S irradiated on the pixel area PA, which corresponds to the state (c) in FIG. 4.

For example, as illustrated in FIG. 5A, the control circuit 16 counts, as the size information, the number of pixels (eight pixels) of the spot-beam irradiated circular region R(a) along one diameter parallel to the column direction in the pixel area PA based on the picked-up image. Similarly, as illustrated in FIG. 5B, the control circuit 16 counts, as the size information, the number of pixels (eleven pixels) of the spot-beam irradiated circular region R(b) along one diameter parallel to the column direction in the pixel area PA based on the picked-up image.

Figure 5C:
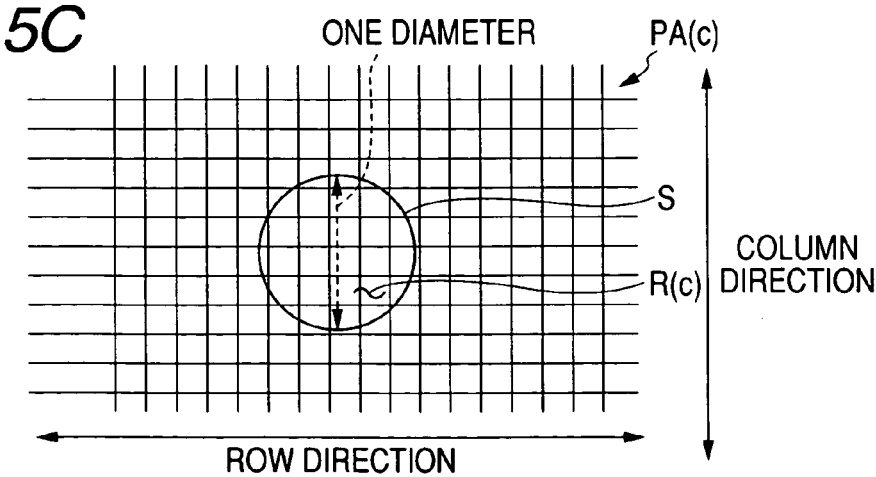
FIG. 5C is a view schematically illustrating the spot beam irradiated on the pixel area of the photodetector, which corresponds to the state (c) in FIG. 4.

Furthermore, as illustrated in FIG. 5C, the control circuit 16 counts, as the size information, the number of pixels (six pixels) of the spot-beam irradiated circular region R(c) along one diameter parallel to the column direction in the pixel area PA based on the picked-up image.

In the first embodiment, the control circuit 16 therefore serves as a first pickup unit, a measuring unit, and a distance determining unit.

As illustrated in FIG. 6, when the trigger switch 2 is turned on, the control circuit 16 causes the spot-beam irradiating unit 6 to turn on the substantially collimated spot beam S on the target R (see FIG. 4) while keeping the light illuminating device 5 turned off. During the irradiation of the spot beam S on the target R with the illuminating light being turned off, the image (spot beam image) of the target R is picked up by the photodetector 3.

After the image pickup operation, while keeping the spot-beam irradiating unit 6 turned off, the control circuit 16 causes the light illuminating devices 5 to turn on so that the image of the two-dimensional code Q in the target R is picked up by the photodetector 3 (see FIG. 6). Specifically, two-step image pickup operation is executed.

When the spot beam image is picked up by the photodetector 3 in the first image pickup step, the size information indicative of the size of the spot beam S is obtained by the control circuit 16 based on the picked-up spot beam image. This allows the reading distance L between the reading window 1c and the target R to be measured by the controller 16 based on the obtained size information.

In the first embodiment, at least one item of the size information indicative of the size of the spot beam S irradiated on the target R have been measured with at least one change in the distance L before shipment of the code reader CR at the factory. Preferably, two or more items of the size information indicative of the size of the spot beam S irradiated on the target R have been measured with corresponding two or more changes in the distance L before shipment of the code reader CR at the factory.

The data representing the relationship between the items of the size information and the corresponding values of the reading distance L has been previously stored in the memory 19 as "relational data RD" before shipment of the code reader CR at the factory.

Specifically, in the first embodiment, the controller 16 is programmed to determine the reading distance L between the reading window 1c and the target R based on the obtained size information and the relational data RD.

In the first embodiment, the control circuit 16 operates to control the exposure time (shutter speed) of the photodetector 3 depending on the determined reading distance L when picking up the image of the two-dimensional code Q in the second image pickup step.

Specifically, in the first embodiment, the control circuit 16 is programmed to control the exposure time of the photodetector 3 so that the farer the determined reading distance L is, the longer the exposure time.

Still furthermore, if the determined reading distance L is out of a previously determined range that suitable for reading the target R, for example, the determined reading distance L is too short or long to be out of the previously determined range, the control circuit 16 can control at least one of the beeper 13 and the crystal liquid display 12 to send notice indicative of the reading distance L being outside of the previously determined range.

For example, the beeper 13 and/or the crystal liquid display 12 serve as a determining unit.

Next, the operations of the two-dimensional code reader CR according to the first embodiment will be described hereinafter in accordance with FIGS. 7 and 8.

FIG. 7 is a flowchart indicative of the operations executed by the control circuit 16 in accordance with the loaded program when obtaining the data representing the relationship between the items of the size information and the corresponding values of the reading distance L before shipment of the code reader CR at the factory.

As shown in FIG. 7, in step S1, the control circuit 16 makes operate the photodetector 3 while a dummy target R' is located at a first position whose distance from the reading window 1c has been previously determined of, for example, L1 (=100 mm) and the spot beam S is being irradiated on the dummy target R'. The spot beam S irradiated on the dummy target R' is imaged on the pixel area PA of the photodetector 3. The photodetector 3, therefore, picks up the imaged spot beam S of the dummy target R' as the spot beam image. The picked up spot beam image is amplified by the amplifier 17 to be converted into spot-beam image data (digital image data) by the A/D converter 18.

In step S2, the control circuit 16 subjects the spot beam image data (digital image data) to image processing, such as binarizing processing, to obtain the size information indicative of the relative size of the spot beam S on the pixel area PA of the photodetector 3 based on the picked up spot beam image. For example, the control circuit 16 obtains, as the size information, the number of pixels of the spot-beam irradiated circular region along one diameter parallel to the column direction in the pixel area PA (see FIGS. 5A to 5C).

Subsequently, in step S3, the control circuit 16 stores in the memory 19 the relationship between the value (L1=100 mm) of the reading distance L and the obtained size information as part of the relational data RD.

In step S4, the control circuit 16 makes operate the photodetector 3 while the dummy target R' is located at a second position whose distance from the reading window 1c has been previously determined of, for example, L3 (=300 mm) and the spot beam S is being irradiated on the dummy target R'. The spot beam S irradiated on the dummy target R' is imaged on the pixel area PA of the photodetector 3. The photodetector 3, therefore, picks up the imaged spot beam S of the dummy target R' as the spot beam image. The picked up spot beam image is amplified by the amplifier 17 to be converted into spot-beam image data (digital image data) by the A/D converter 18.

In step S5, the control circuit 16 subjects the spot beam image data (digital image data) to image processing, such as binarizing processing, to obtain the size information indicative of the relative size of the spot beam S on the pixel area PA of the photodetector 3 based on the picked up spot beam image. For example, the control circuit 16 obtains, as the size information, the number of pixels of the spot-beam irradiated circular region along one diameter parallel to the column direction in the pixel area PA (see FIGS. 5A to 5C).

Subsequently, in step S6, the control circuit 16 stores in the memory 19 the relationship between the value (L3=300 mm) of the reading distance L and the obtained size information as part of the relational data RD.

As clearly seen in FIG. 4, assuming that, as the size information, the number of pixels of the spot-beam irradiated circular region along one diameter parallel to the column direction in the pixel area PA is represented by "x", the variable x is inversely related to the reading distance L between the reading window 1c and the target R. Specifically, the relationship between the variable x and the reading distance L is given by L=a+b/x, where a and b are constants.

Measuring, therefore, the relationships between at least two values of the variable x (the number of pixels) and corresponding values of the reading distance L allows values of the constants a and b to be easily calculated by means of simple simultaneous equations.

Note that, even if the relation between one value of the variable x (the number of pixels) and a corresponding value of the reading distance L has been measured, it is possible to calculate values of the constants a and b by considering a relation between one value of the variable x and a corresponding value of the reading distance L, which will be obtained in the first image pickup step.

In addition, even if a positional deviation between the position of the spot-beam irradiating unit 6 and that of the imaging optics (the imaging lens 4 and the photodetector 3) in assembling, the determination of the relationship between the size of the spot beam S and the reading distance L before shipment can absorb the positional deviation. Similarly, even if an angular deviation from perfect alignment between the optical axis of the spot-beam irradiating unit 6 and that of the imaging optics occurs in assembling, the determination of the relationship between the size of the spot beam S and the reading distance L before shipment can absorb the angular deviation.

Thereafter, when a user wants to read the two-dimensional code Q written on the target R, the user makes locate the code reader CR so that the reading window 1c thereof is opposite to the target R and away therefrom at an arbitrary distance.

While the code reader CR is arranged in such a state, the user pushes the trigger switch 2, the controller 16 causes the spot-beam irradiating unit 6 to irradiate the collimated spot beam S so that the spot beam S is irradiated on the target R (see FIG. 4).

Figure 8:
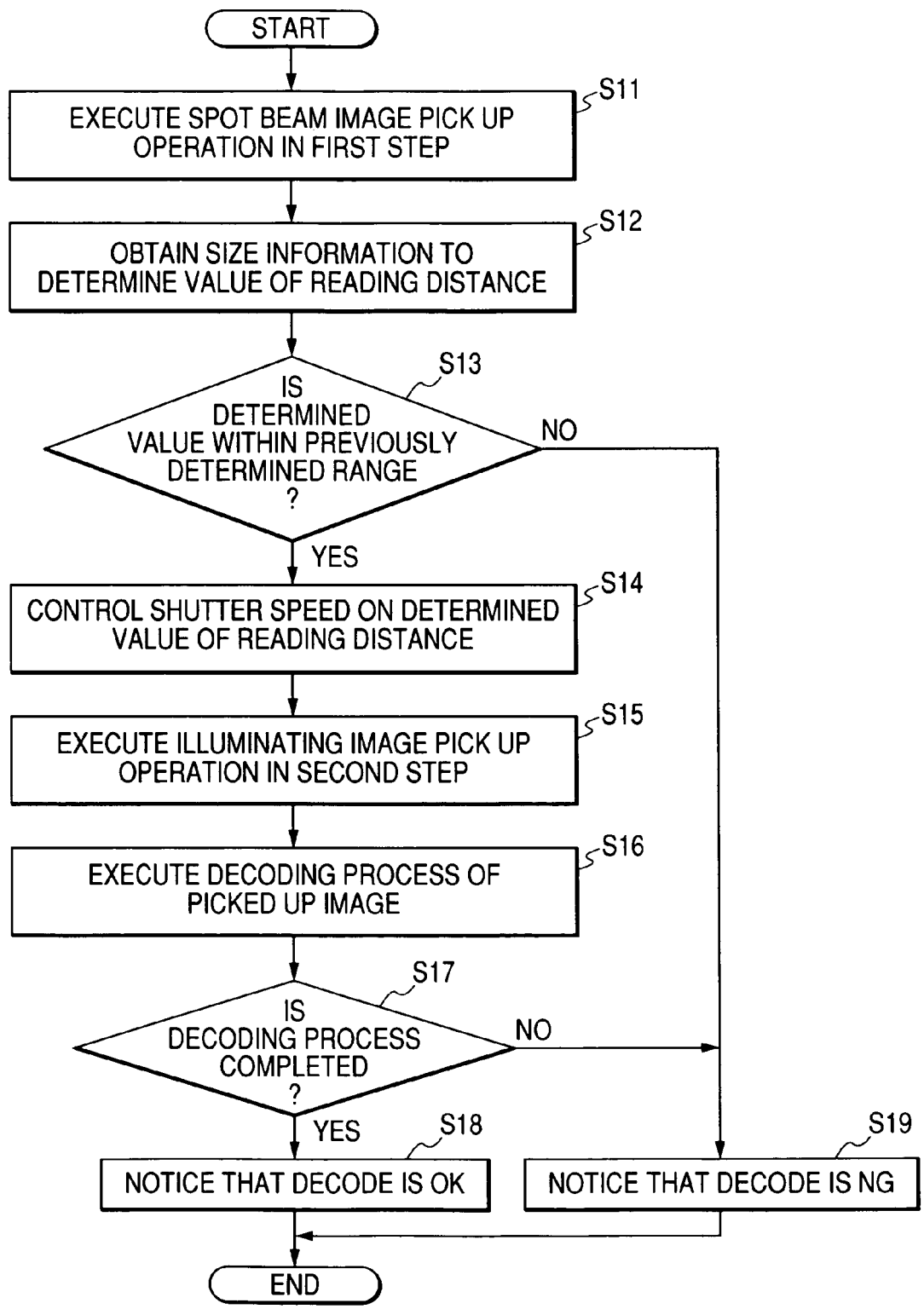
FIG. 8 is a flowchart schematically illustrating operations for reading out a two-dimensional code executed by the control circuit in response to a turn-on operation of a trigger switch according to the first embodiment.

While the spot beam S is being irradiated on the target R, in step S11 of FIG. 8, the control circuit 16 exposes the photodetector 3 to pick up the spot beam image in the first image pickup step. Specifically, while each of the light illuminating devices 5 is in off state, the collimated spot beam S M irradiated on the target R is imaged on the pixel area PA of the photodetector 3. The spot beam image, therefore, is picked up by the photodetector 3. The picked up spot beam image is amplified by the amplifier 17 to be converted into spot-beam image data (digital image data) by the A/D converter 18.

In step S12, the control circuit 16 subjects the spot-beam image data (digital image data) to image processing, such as binarizing processing, to obtain the size information indicative of the relative size of the spot beam S on the pixel area PA of the photodetector 3 based on the picked up spot beam image.

Specifically, in step S12, the control circuit 16 obtains, as the size information, the number of pixels of the spot-beam irradiated circular region along one diameter parallel to the column direction in the pixel area PA (see FIGS. 5A to 5C).

In step S12, the control circuit 16 refers to the relational data RD to determine the value of the reading distance L corresponding to the obtained size information based on the relational data RD.

In step S13, the control circuit 16 determines whether the determined value of the reading distance L is within the previously determined range. When the determined value of the reading distance L is too short to be out of the previously determined range, the determination in step S13 is NO, the control circuit 16 shifts to step S19. When the determined value of the reading distance L is too long to be out of the previously determined range, the determination in step S13 is also NO, the control circuit 16 shifts to step S19.

In step S19, the control circuit 16 controls at least one of the beeper 13 and the crystal liquid display 12 to provide notice indicative of the current value of the reading distance L being outside of the previously determined range, terminating the operations; this notice represents that the current value of the reading distance is NG (not good).

In contrast, when the determined value of the reading distance L is within the previously determined range, the determination in step S13 is YES, the control circuit 16 shifts to step S14.

In step S14, the control circuit 16 controls the exposure time (shutter speed) of the photodetector 3 based on the determined value of the reading distance L in the second image pickup step.

Subsequently, in step S15, the control circuit 16 turns each of the light illuminating devices 5 on with the spot-beam irradiating device 6 being turned off. The control circuit 16 exposes the photodetector 3 based on the determined shutter speed (exposure time) to pick up the image of the target R on which the illuminating light is being irradiated.

This results in that the illuminating light irradiated on the target R is imaged on the pixel area PA of the photodetector 3. The illuminating image is therefore picked up by the photodetector 3.

Because the shutter speed of the photodetector 3 has been suitably determined depending on the current value of the reading distance L in step S14, the image of the two-dimensional code Q based on the illuminating light is completely accurately picked up in the pixel area PA of the photodetector 3. The picked up image is amplified by the amplifier 17, and converted into image data (digital image data) by the A/D converter 18.

In step S16, the control circuit 16 subjects the image data to image processing, such as binarizing processing, and controls the specified ratio detection circuit 20, the synchronous signal generator 21, and the address generator 22 to decode the two-dimensional code Q based on the image-processed image data.

In step S17, the control circuit 16 determines whether the decoding has been successfully completed.

When determining that the decoding has been successfully completed (the determination in step S17 is YES), the control circuit 16 controls, for example, the LED 11 to turn it on, thereby providing notice indicative of the decoding of the two-dimensional code Q is OK (the determination in step S17 is YES), exiting the operations.

On the other hand, when determining that the decoding has not been successfully completed (the determination in step S17 is NO), the control circuit 16 controls at least one of the beeper 13 and the crystal liquid display 12 to provide notice indicative of the decoding of the two-dimensional code Q is NG (not good), exiting the operations.

As described above, in the first embodiment, the reading mechanism RM including the spot-beam irradiating unit 6 allows the substantially collimated spot beam S to be irradiated on the target R, and the imaging lens 4 has the constant field angle $\theta$. This creates a relationship in which the farer the reading distance L from the reading window 1c of the code reader CR to the target R is, the larger the size of the field of view F of the photodetector 3 on the target R is.

The relative relationship between the reading distance L and the size of the field of view F on the target R permits the spot beam size on the pixel area PA to vary with change in the reading distance L. The control circuit 16 is configured to measure the reading distance L between the reading window 1c and the target R based on the relationship between the spot beam size and the reading distance L.

In the first embodiment, therefore, it is possible to measure the reading distance L using the spot-beam irradiating unit 6 composed of the light source 7 and the condenser lens 8 without installing a range sensor with a high cost and a large size. This allows the cost of the two-dimensional code reader CR according to the first embodiment to decrease.

In addition, in the first embodiment, it is possible to eliminate the use of a space required to install a new range sensor, making the structure of the code reader CR simple and compact.

Moreover, in the first embodiment, it is possible to sufficiently accurately determine the reading distance L with decreasing error of measurement, as compared with a conventional code reader having means for measuring a period between the irradiation timing of a laser beam and the receiving timing of a reflected beam based on the irradiated laser beam.

Furthermore, in the first embodiment, appropriately determining the shutter speed (exposure time) of the photodetector 3 in the second image pickup step depending on the reading distance L between the target R and the reading window 1c permits the image to be well picked up by the photodetector 3. When the determined reading distance L is out of the predetermined range, it is possible to send a notice indicative the current reading distance L is NG to the user. This prompts the user to change the current location of the code reader CR, thereby changing the reading distance L between the target R and the reading window 1c of the code reader CR to more appropriate one.

Specifically, in the first embodiment, in the two-step image pickup operation, the spot-beam image is firstly picked up by the photodetector 3; secondly the image of the two-dimensional code Q based on the illuminating light with the spot beam being turned off is picked up thereby. This allows both the size information of the spot beam S and the two-dimensional code Q to be accurately detected. Moreover, in the first embodiment, items of the size information indicative of the size of the spot beam S irradiated on the target R have been measured with changes in the distance L before shipment of the code reader CR at the factory. The data representing the relationship between the items of the size information and the corresponding values of the reading distance L has been previously stored in the memory 19 as "relational data RD" before shipment of the code reader CR at the factory.

Even if a positional deviation between the position of the spot-beam irradiating unit 6 and that of the imaging optics in assembling, the determination of the relationship between the size of the spot beam S and the reading distance L before shipment can absorb the positional deviation. Similarly, even if an angular deviation from perfect alignment between the optical axis of the spot-beam irradiating unit 6 and that of the imaging optics occurs in assembling, the determination of the relationship between the size of the spot beam S and the reading distance L before shipment can absorb the angular deviation.

Moreover, in the first embodiment, the collimated spot beam S is traveled across the optical axis O and along one edge E of the field F1 defined by the field angle θ to be irradiated in the field of view F on the target R at its one corner portion; this one corner portion is out of the way of the information code readout operation.

Second Embodiment

Figure 9:
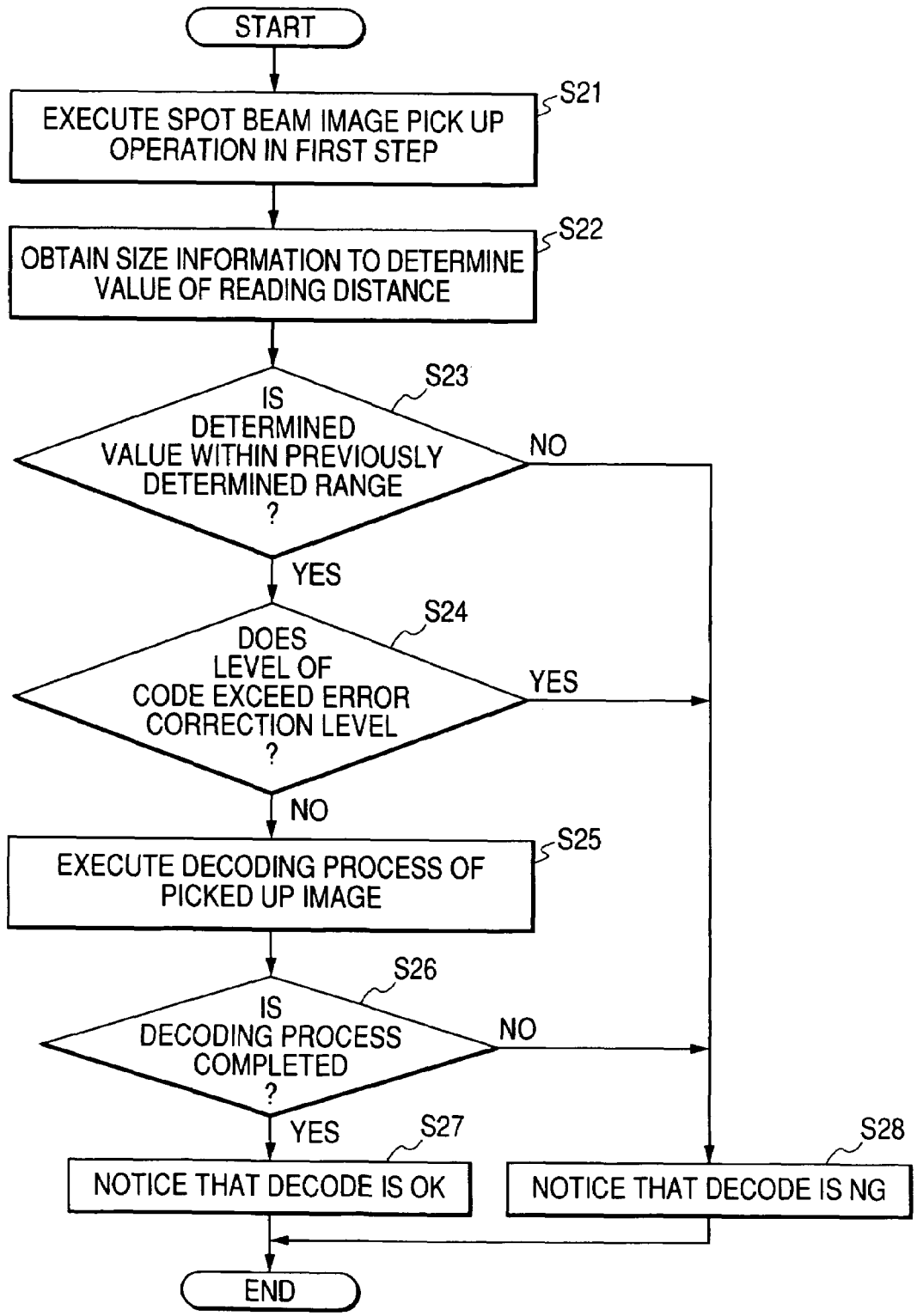
FIG. 9 is a flowchart schematically illustrating operations for reading out the two-dimensional code executed by the control circuit in response to the turn-on operation of the trigger switch according to a second embodiment of the present invention.

FIG. 9 illustrates a second embodiment of the present invention. In the second embodiment, explanations of the elements of the two-dimensional code reader according to the second embodiment, which are substantially identical with those of the code reader CR according to the first embodiment, are omitted or simplified. Specifically, explanations are focused on the different points between the code reader according to the second embodiment and the code reader CR according to the first embodiment.

In the second embodiment, in place of performing the two image pickup steps, after the spot beam image has been picked up, measurement of the size information of the spot beam S and decoding of the two-dimensional code Q are carried out based on the same picked-up image.

Moreover, as the photodetector 3, a color CCD area sensor that can pickup an image based on light irradiated on the pixel area while identifying colors of the irradiated light is employed.

In addition, the two-dimensional code Q, such as QR code, has Reed Solomon code as an example of an error-correcting code. The Reed Solomon code allows correcting errors included in the two-dimensional code, even if the code area of the two-dimensional code Q is dirty or damaged up to 30% that represents the error correction level (capability) of a two-dimensional code. The error correction level has been previously determined depending on the size of the two-dimensional code. The second embodiment uses such an error correcting function based on the Reed Solomon code, which has been well known, so that detailed descriptions of the error correcting functions are omitted.

FIG. 9 is a flowchart substantially illustrating the operations for reading out the two-dimensional code Q, such as QR code, executed by the control circuit 16 in response to the turn-on operation of the trigger switch 2.

As shown in FIG. 9, when a user wants to read the two-dimensional code Q written on the target R, the user makes locate the code reader CR so that the reading window 1c thereof is opposite to the target R and away therefrom at an arbitrary distance.

While the code reader CR is arranged in such a state, the user pushes the trigger switch 2. The user's switch-on operation of the trigger switch 2 causes the controller 16 to make the spot-beam irradiating unit 6 irradiate the collimated spot beam S and to make each of the light illuminating devices 5 turn on the illuminating light. As a result, the spot beam S is irradiated on the target R, and the illuminating light is also irradiated on the two-dimensional code Q of the target R.

While the spot beam S and the illuminating light are being irradiated on the target R, in step S21 of FIG. 9, the control circuit 16 exposes the photodetector 3 to pick up the image of the target R on which the illuminating light is being irradiated and on which the spot beam S is being irradiated. Specifically, the illuminating light and the spot beam S irradiated on the target R are imaged on the pixel area PA of the photodetector 3. The image is therefore picked up by the photodetector 3. The picked up image is amplified by the amplifier 17 to be converted into image data (digital image data) by the A/D converter 18.

In step S22, the control circuit 16 subjects the image data to image processing, such as binarizing processing, to obtain the size information indicative of the relative size of the spot beam S on the pixel area PA of the photodetector 3 based on the picked up image, which is similar in step S12.

In the second embodiment, because the color of the spot beam S is different from that of the illuminating light, such as green, and the photodetector 3 has color identification capability set forth above, the control circuit 16 can differentiate the component of the spot beam S in the picked up image from the component of the illuminating light therein.

Subsequently, in step S22, the control circuit 16 refers to the relational data RD to determine the value of the reading distance L corresponding to the obtained size information based on the relational data RD.

In step S23, the control circuit 16 determines whether the detected value of the reading distance L is within the previously determined range. When the determined value of the reading distance L is too short to be out of the previously determined range, the determination in step S23 is NO, the control circuit 16 shifts to step S28. When the determined value of the reading distance L is too long to be out of the previously determined range, the determination in step S23 is also NO, the control circuit 16 shifts to step S28.

In step S28, the control circuit 16 controls at least one of the beeper 13 and the crystal liquid display 12 to provide notice indicative of the current value of the reading distance L being outside of the previously determined range, exiting the operations; this notice represents that the current value of the reading distance is NG.

On the other hand, when the determined value of the reading distance L is within the previously determined range, the determination in step S23 is YES, the control circuit 16 shifts to step S24.

In step S24, the control circuit 16 determines whether decode process using the error correcting function allows decoding of the two-dimensional code Q based on the image-processed digital image data.

If the component of the spot beam S in the image-processed image data corresponding to the picked up image is superimposed on part of the component of the two-dimensional code Q therein, the superimposed part of the image-processed image data may not accurately read out, similar to the dirty or damaged portion.

In step S24, therefore, the control circuit 16 determines whether a level determined by the total area of the superimposed portion and the dirty and/or damaged portions with respect to the whole area of the two-dimensional code Q exceeds the predetermined error correction level of the two-dimensional code Q.

When determining that the determined level of the total area exceeds the predetermined error correction level of the two-dimensional code Q, the determination in step S24 is YES, the control circuit 16 shifts to step S28 to execute the notice (alarm) generating operation like the operation in step S19.

When determining that the determined level of the total area does not exceed the predetermined error correction level of the two-dimensional code, the determination in step S24 is NO, the control circuit 16 proceeds to step S25.

In step S25, the control circuit 16 controls the specified ratio detection circuit 20, the synchronous signal generator 21, and the address generator 22 to decode the two-dimensional code Q based on the image-processed image data by means of the error correcting function using the Reed Solomon code.

In step S26, the control circuit 16 determines whether the decoding is successfully completed.

When determining that the decoding has been successfully completed (the determination in step S26 is YES), the control circuit 16 controls, for example, the LED 11 to turn it on, thereby providing notice indicative of the decoding of the two-dimensional code Q is OK (the determination in step S26 is YES). On the other hand, when determining that the decoding has not been successfully completed (the determination in step S26 is NO), the control circuit 16 controls at least one of the beeper 13 and the crystal liquid display 12 to provide notice indicative of the decoding of the two-dimensional code Q is NG (not good), terminating the operations.

As described above, in the second embodiment, it is possible to measure the reading distance L using the spot-beam irradiating device 6 without installing a range sensor with a high cost and a large size, which is similar to the first embodiment. This allows the cost of the two-dimensional code reader CR according to the second embodiment to decrease. In addition, it is possible to eliminate the use of a space required to install a new range sensor, making the structure of the code reader CR simple and compact.

Moreover, in the second embodiment, one image picking up operation allows both the measurement of the size information of the spot beam S irradiated on the target R and the readout of the two-dimensional code Q to be executed. This makes it possible to further improve the two-dimensional code readout efficiency of the code reader CR.

Note that the present invention is not limited to the first and second embodiments so that various expansions and modifications can be made within the scope of the present invention.

Specifically, in each of the first and second embodiments, the apparatus according to the present invention is applied to optical readout of the two-dimensional code Q, such as QR code, but the present invention is not limited to the application. The present invention can be applied to optical readout of another types of two-dimensional codes and/or one-dimensional codes, such as barcodes.

When reading one-dimensional code, such as a barcode written on a target, it is possible to perform measurement of the size information of the spot beam S and decoding of the one-dimensional code based on the same picked up image like the second embodiment.

Specifically, part of the one-dimensional code along its longitudinal direction (bar direction) in the image-processed image data on which the spot beam S is not irradiated can be read out (scanned). The readout part of the one-dimensional code in the image-processed image is decoded. For example, when the code reader CR is arranged such that the row direction of the pixel area PA is parallel to the longitudinal direction of the one-dimensional code, part of the one-dimensional code along its longitudinal direction in the image-processed image data can be read out along a plurality of row scan lines in the pixel area PA.

In each of the first and second embodiments, the determined reading distance L between the reading window 1c and the target R is applied to determination of whether the reading distance L is suitable for reading out the target R and adjustment of the shutter speed, but the present invention is not limited to these applications.

Figure 10:
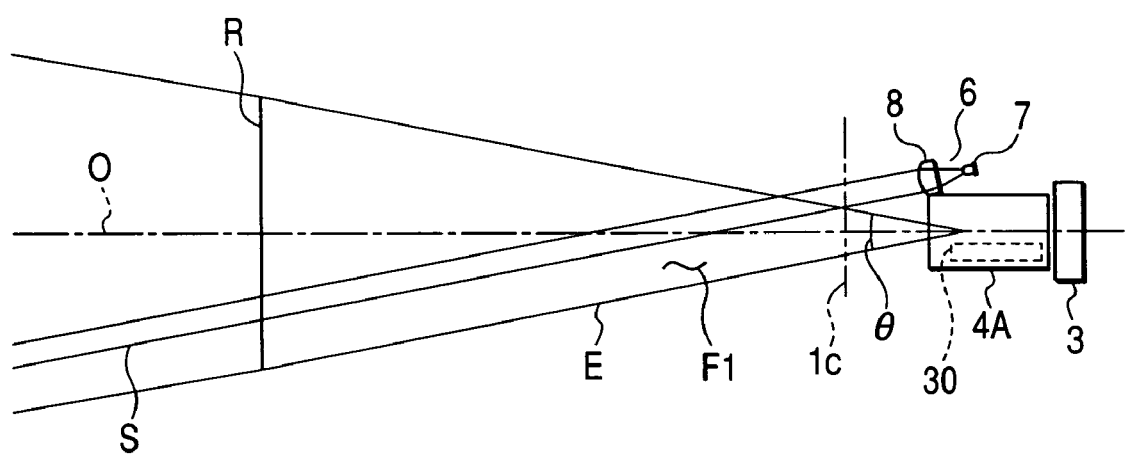
FIG. 10 is a view schematically illustrating the structure of a two-dimensional code reader according to a first modification of the present invention.

Specifically, in a first modification, as illustrated in FIG. 10, the imaging lens 4A of the imaging optics can be provided with a focal point variable mechanism 30 mechanically linked to at least one of the lens elements or at least one mirror if it is installed. The focal point variable mechanism 30 is configured to move the at least one of the lens elements or the at least one mirror along the optical axis O to change the focal point. In the first modification, the determined reading distance L between the reading window 1c and the target R can be applied to adjustment of the focal point of the imaging lens by the focal point variable mechanism.

In another modification, each of the light illuminating devices can make the illuminating light intensity adjustable. In another modification, the determined reading distance L between the reading window 1c and the target R can be applied to adjustment of the illuminating light intensity.

For example, each of the illuminating devices can adjust the illuminating light intensity such that, the farer the determined reading distance L is, the higher the illuminating light intensity is. This makes it possible to accurately read out the two-dimensional code.

In the first embodiment, two-step image pickup operation is executed in response to the switching on of the trigger switch 2, but the present invention is not limited to the operation.

As a further modification, the trigger switch can be designed to allow a user to push the trigger switch 2 in two strokes (first and second strokes).

Specifically, in the further modification, when the user pushes the trigger switch 2 in the first stroke, such as in half stroke, the trigger switch's first stroke allows the control circuit 16 to cause the spot-beam irradiating unit 6 to irradiate the spot beam S.

In addition, when the user pushes the trigger switch 2 in the second stroke, such as in full stroke, the trigger switch's second stroke allows the control circuit 16 to execute the image picking up operations.

The spot-beam irradiating unit 6 can continuously irradiate the spot beam S except when reading out the target R by the photodetector 3.

The configuration of the collimated spot beam S can be modified. For example, the collimated spot beam S can have a rectangular shape or a bar shape in its lateral cross section. The spot-beam irradiating unit 6 can make the spot beam S blink.

In each of the first and second embodiments, the present invention is applied to a gun-shaped two-dimensional code reader, but the present invention is not limited to the structure of each of the first and second embodiments. Specifically, an optical information reader according to the present invention may have a handheld structure. In addition, an optical information reader according to the present invention can be previously installed in a system such as FA (Factory Automation) system. Notice means for sending a notice to a user is not limited to the structure shown in each of the first and second embodiments, and various types of notice units can be applied.

The spot-beam irradiating unit 6 can be disposed to one radial side of the imaging lens 4 such that the optical axis of the spot-beam irradiating unit 6 is parallel to the optical axis O of the imaging optics.

In addition, an optical information reader according to the present invention can be provided with a marker beam irradiating device for marking the location of the field of view F of the photodetector 3 on the target R and/or a predetermined position in the field of view F, such as the center thereof, on the target R.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for optically reading out, through an imaging optics, information by a photodetector, the information being attached to a target, the apparatus comprising:

a collimated-beam irradiating unit configured to irradiate on the target a substantially collimated beam with a size thereon;

a first pickup unit configured to cause the photodetector to pick up through the imaging optics a first image of the target while the substantially collimated beam is being irradiated on the target by the collimated-beam irradiating unit;

a measuring unit configured to measure size information indicative of the size of the collimated beam being irradiated on the target based on the picked-up first image; and a distance determining unit configured to determine a distance between the apparatus and the target based on the measured size information of the collimated beam, wherein the imaging optics has a predetermined field angle, and the collimated-beam irradiating unit is configured to irradiate on the target the substantially collimated beam along one edge of a field defined by the field angle of the imaging optics.

2. An apparatus according to claim 1, wherein the collimated-beam irradiating unit is provided with a light source and a condenser lens with a predetermined focal point, the light source being disposed at the focal point of the condenser lens to be coaxial thereto.

3. An apparatus according to claim 1, wherein the substantially collimated beam has a predetermined color, further comprising an illuminating light irradiating unit configured to irradiate illuminating light with a predetermined color on the target, the color of the substantially collimated beam being different from that of the illuminating light.

4. An apparatus according to claim 1, further comprising a storing unit configured to store relational data indicative of a relationship between at least one item of the size information and corresponding at least one value of the distance between the apparatus and the target, wherein the distance determining unit is configured to determine the distance between the apparatus and the target based on the relational data and the measured size information.

5. An apparatus according to claim 1, further comprising a determining unit configured to:

determine whether the determined distance is within a predetermined range; and when determining that the determined distance is out of the predetermined range, send a notice representing that the determined distance is out of the predetermined range.

6. An apparatus according to claim 1, further comprising:

an illuminating light irradiating unit configured to irradiate illuminating light on the target; and a second pickup unit configured to cause the photodetector to pick up through the imaging optics a second image of the target while the illuminating light is being irradiated on the target and the substantially collimated beam is kept off after the pickup of the first image.

7. An apparatus according to claim 6, further comprising an exposure time determining unit configured to determine an exposure time of the photodetector depending on the determined distance between the apparatus and the target, wherein the second pickup unit is configured to expose the photodetector based on the determined exposure time to pick up through the imaging optics the second image of the target.

8. An apparatus according to claim 1, further comprising:

an illuminating light irradiating unit configured to irradiate illuminating light on the target, the first pickup unit being configured to cause the photodetector to pick up through the imaging optics the first image of the target while the substantially collimated beam and the illuminating light are being irradiated on the target by the collimated-beam irradiating unit and the illuminating light irradiating unit, respectively; and a decoding unit configured to decode the information based on the first image.

9. An apparatus according to claim 1, further comprising a focal point adjusting unit configured to automatically adjust a focal point of the imaging optics based on the determined distance between the apparatus and the target.

10. A method of optically reading out, through an imaging optics installed in an apparatus, information by a photodetector installed therein, the information being attached to a target, the method comprising:

irradiating on the target a substantially collimated beam with a size thereon;

causing the photodetector to pick up through the imaging optics a first image of the target while the substantially collimated beam is being irradiated on the target;

measuring size information indicative of the size of the collimated beam being irradiated on the target based on the picked-up first image; and determining a distance between the apparatus and the target based on the measured size information of the collimated beam, wherein the imaging optics has a predetermined field angle, and the collimated-beam irradiating step irradiates the target with the substantially collimated beam along one edge of a field defined by the field angle of the imaging optics.

11. An apparatus for optically reading out, through an imaging optics, information by a photodetector, the information being attached to a target, the apparatus comprising:

a collimated-beam irradiating unit configured to irradiate on the target a substantially collimated beam with a size thereon;

a first pickup unit configured to cause the photodetector to pick up through the imaging optics a first image of the target while the substantially collimated beam is being irradiated on the target by the collimated-beam irradiating unit;

a measuring unit configured to measure size information indicative of the size of the collimated beam being irradiated on the target based on the picked-up first image; and a distance determining unit configured to determine a distance between the apparatus and the target based on the measured size information of the collimated beam;

an illuminating light irradiating unit configured to irradiate illuminating light on the target, the first pickup unit being configured to cause the photodetector to pick up through the imaging optics the first image of the target while the substantially collimated beam and the illuminating light are being irradiated on the target by the collimated-beam irradiating unit and the illuminating light irradiating unit, respectively, the information being a two-dimensional code including an error-correcting code, the error correcting code allowing correcting errors included in the two-dimensional code depending on a predetermined error correction level of the two-dimensional code; and a decoding unit configured to:

determine whether a determination level depending on a total area of a dirty or damaged portion and a superimposed portion in the first image with respect to a whole area of the two-dimensional code exceeds the error correction level, the superimposed portion being a portion on which a component of the substantially collimated beam in the first image and that of the two-dimensional code therein are superimposed; and decode the information based on the first image when it is determined that the determination level does not exceed the error correction level.

12. An apparatus according to claim 11, wherein the collimated-beam irradiating unit is provided with a light source and a condenser lens with a predetermined focal point, the light source being disposed at the focal point of the condenser lens to be coaxial thereto.

13. An apparatus according to claim 11, wherein the substantially collimated beam has a predetermined color, further comprising an illuminating light irradiating unit configured to irradiate illuminating light with a predetermined color on the target, the color of the substantially collimated beam being different from that of the illuminating light.

14. An apparatus according to claim 11, further comprising a storing unit configured to store relational data indicative of a relationship between at least one item of the size information and corresponding at least one value of the distance between the apparatus and the target, wherein the distance determining unit is configured to determine the distance between the apparatus and the target based on the relational data and the measured size information.

15. An apparatus according to claim 11, further comprising a determining unit configured to:

determine whether the determined distance is within a predetermined range; and when determining that the determined distance is out of the predetermined range, send a notice representing that the determined distance is out of the predetermined range.

16. An apparatus according to claim 11, further comprising:

an illuminating light irradiating unit configured to irradiate illuminating light on the target; and a second pickup unit configured to cause the photodetector to pick up through the imaging optics a second image of the target while the illuminating light is being irradiated on the target and the substantially collimated beam is kept off after the pickup of the first image.

17. An apparatus according to claim 16, further comprising an exposure time determining unit configured to determine an exposure time of the photodetector depending on the determined distance between the apparatus and the target, wherein the second pickup unit is configured to expose the photodetector based on the determined exposure time to pick up through the imaging optics the second image of the target.

18. An apparatus according to claim 11, further comprising a focal point adjusting unit configured to automatically adjust a focal point of the imaging optics based on the determined distance between the apparatus and the target.

19. A method of optically reading out, through an imaging optics installed in an apparatus, information by a photodetector installed therein, the information being attached to a target, the method comprising:

irradiating on the target a substantially collimated beam with a size thereon;

causing the photodetector to pick up through the imaging optics a first image of the target while the substantially collimated beam is being irradiated on the target;

measuring size information indicative of the size of the collimated beam being irradiated on the target based on the picked-up first image;

determining a distance between the apparatus and the target based on the measured size information of the collimated beam;

irradiating illuminating light on the target, the causing step causing the photodetector to pick up through the imaging optics the first image of the target while the substantially collimated beam and the illuminating light are being irradiated on the target by the collimated-beam irradiating step and the illuminating light irradiating step, respectively, the information being a two-dimensional code including an error-correcting code, the error correcting code allowing correcting errors included in the two-dimensional code depending on a predetermined error correction level of the two-dimensional code;

determining whether a determination level depending on a total area of a dirty or damaged portion and a superimposed portion in the first image with respect to a whole area of the two-dimensional code exceeds the error correction level, the superimposed portion being a portion on which a component of the substantially collimated beam in the first image and that of the two-dimensional code therein are superimposed; and decoding the information based on the first image when it is determined that the determination level does not exceed the error correction level.

* * * * *